United States Patent [19]

Shimizu et al.

[11] Patent Number: 5,484,855
[45] Date of Patent: Jan. 16, 1996

[54] POLYMER SCALE PREVENTIVE PROCESS

[75] Inventors: Toshihide Shimizu, Urayasu; Mikio Watanabe, Kamisu, both of Japan

[73] Assignee: Shin-Etsu Chemical Co., Ltd., Tokyo, Japan

[21] Appl. No.: 181,091

[22] Filed: Jan. 13, 1994

[30] Foreign Application Priority Data

Jan. 13, 1993 [JP] Japan .................................. 5-020664

[51] Int. Cl.$^6$ ..................................................... C08F 2/00
[52] U.S. Cl. .............................................. 526/62; 526/74
[58] Field of Search ......................................... 526/62, 74

[56] References Cited

U.S. PATENT DOCUMENTS 4,081,248  3/1978  Cohen ........................................ 526/62
5,115,051  5/1992  Shimizu et al. ............................ 526/62

Primary Examiner—Joseph L. Schofer
Assistant Examiner—Tom Weber
Attorney, Agent, or Firm—Oblon, Spivak, McClelland, Maier & Neustadt

[57] ABSTRACT

A polymer scale preventive process for use in polymerization of a monomer having an ethylenically unsaturated double bond, comprising an alkaline solution containing (A) a condensation product of (A-1) an aromatic compound having at least two amino groups with (A-2) an aromatic tetracarboxylic acid anhydride, and (B) at least one member selected from the group consisting of (B-1) a water-soluble polymeric compound and (B-2) an inorganic colloid. The scale preventive process is low in virulence or the like, and high in safety. The process is used for forming a coating on inner wall surfaces of a polymerization vessel. Where such a polymerization vessel is used to carry out the polymerization, polymer scale deposition can be effectively prevented, not only on areas in the liquid-phase region but on areas around the gas-liquid interface in the vessel, and the resulting polymeric product shows few fish eyes and good whiteness when formed into sheets or the like.

15 Claims, No Drawings

POLYMER SCALE PREVENTIVE PROCESS

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

Heretofore, methods for polymerization of a monomer having an ethylenically unsaturated double bond have been known, such as suspension, emulsion, solution, gas phase and bulk polymerization processes and the like. In any of these polymerization processes, polymer scale is liable to be deposited on the areas with which the monomer comes into contact, such as inner walls, stirring equipment and so on of a polymerization vessel.

The deposition of the polymer scale results in disadvantages that the yield of the polymer and cooling capacity of the polymerization vessel are lowered, and that the polymer scale may peel off and mix into a polymeric product, thereby impairing the quality of formed products obtained by processing the polymeric product. In addition, removal of deposited polymer scale is very laborious and time-consuming. Further, the polymer scale contains unreacted monomers and, therefore, may cause physical disorders in the operators, which has been a very serious problem in recent years.

For preventing polymer scale deposition on the polymerization vessel inner wall and so forth, methods have been known, for example, a method in which a polymer scale preventive agent comprising a polar organic compound such as amine compounds, quinone compounds, aldehyde compounds, etc. is applied to the polymerization vessel inner wall and so on to form a coating and a method in which such compounds are added to an aqueous medium for suspension polymerization (Japanese Patent Publication (KOKOKU) No. 45-30343 (1970)), as practiced in some instances of suspension polymerization of vinyl chloride.

However, these methods have the disadvantage that, although the polymer scale preventive effect is exhibited while polymerization is repeated for up to about 5 or 6 batches, the effect diminishes if the number of repeated batches of polymerization exceeds 5 or 6 (that is, the scale preventive effect is poor in durability). The disadvantage is emphasized particularly where a water-soluble catalyst is used for polymerization, and, in this point, the polymer scale prevention according to these methods is unsatisfactory industrially.

For overcoming the above disadvantage, methods have been proposed in which the inner wall of a polymerization vessel is coated with a polymer scale preventive agent whose effective constituent is, for example, a condensation product of an aromatic amine compound and an aromatic nitro compound (Japanese Patent Publication (KOKOKU) No. 60-30681 (1985)), a reaction product of a phenolic compound with an aromatic aldehyde (Japanese Pre-examination Patent Publication (KOKAI) No. 57-192414 (1982)), a reaction product of a polyhydric phenol with an aliphatic aldehyde (Japanese Patent Publication (KOHYO) No. 57-502169 (1982)), a reaction product of 1-naphthol with formaldehyde (Japanese Patent Publication (KOKOKU) No. 01-31523 (1989)), or the like. Where one of these known polymer scale preventive agents is applied to the areas with which monomers come into contact, such as the inner wall surface of a polymerization vessel, and a coating is thereby formed, it is possible to repeat about 100 to 200 batches of polymerization without causing deposition of polymer scale on the areas located in the liquid-phase region inside the polymerization vessel. Besides, even in the above-mentioned case where a water-soluble catalyst is used, deposition of polymer scale in the liquid-phase region is similarly prevented.

However, even if the coating is formed by use of the polymer scale preventive agent containing such an effective component as the condensation product of an aromatic amine compound and an aromatic nitro compound, etc. as mentioned above, there remains a drawback that polymer scale deposition may occur on the areas around the interface between the liquid phase and the gas phase located at an upper portion of the interior of the polymerization vessel.

Once polymer scale deposition occurs on areas around the interface between the gas and liquid phases, the deposited scale will grow gradually as polymerization runs are repeated, and at last it may peel off to be incorporated into the polymeric product. If the polymeric product with the polymer scale thus mixed therein is processed into formed products such as sheets or the like, the polymer scale causes generation of many fish eyes in the formed products, thereby lowering seriously the quality of the formed products.

Besides, where a polymeric product is processed into formed products such as sheets, etc., the formed products are required to have a high whiteness. That is, when a polymeric product formed into a sheet or the like without any addition of a coloring agent, the resulting formed product is more or less colored and such coloration, called initial coloration, is desired to be as slight as possible. However, the coating formed by using the polymer scale preventive agent containing such an effective component as the condensation product of an aromatic amine compound and an aromatic nitro compound, etc. as above mentioned may mix into a polymeric product through peeling or dissolution, thereby lowering the whiteness, or increasing the initial coloration, of the resulting formed products.

SUMMARY OF THE INVENTION

It is an object of the present invention to provide a polymer scale preventive agent for use in polymerization of a monomer having an ethylenically unsaturated double bond that can prevent effectively the deposition of polymer scale, not only on areas in the liquid-phase region but also on areas around the interface between the gas and liquid phases inside a polymerization vessel, and that makes it possible to produce a polymer having a very small number of fish eyes and slight initial coloration when processed into formed products such as sheets or the like; and a polymerization vessel and a process for producing a polymer which utilize the polymer scale preventive agent.

The present invention provides, as a means of attaining the above object, a polymer scale preventive agent for use in polymerization of a monomer having an ethylenically unsaturated double bond, which comprises an alkaline solution containing:

(A) a condensation product of (A-1) an aromatic compound having at least two amino groups with (A-2) an aromatic tetracarboxylic acid anhydride, and (B) at least one member selected from the group consisting of (B-1) a water-soluble polymeric compound and (B-2) an inorganic colloid.

The present invention also provides a polymerization vessel for polymerizing a monomer having an ethylenically unsaturated double bond, comprising on its inner wall surfaces a coating which has been formed by applying an alkaline solution containing:

(A) a condensation product of (A-1) an aromatic compound having at least two amino groups with (A-2) an aromatic tetracarboxylic acid anhydride, and (B) at least one member selected from the group consisting of (B-1) a water-soluble polymeric compound and (B-2) an inorganic colloid, followed by drying.

Further, the present invention provides a process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline solution containing:

(A) a condensation product of (A-1) an aromatic compound having at least two amino groups with (A-2) an aromatic tetracarboxylic acid anhydride, and (B) at least one member selected from the group consisting of (B-1) a water-soluble polymeric compound and (B-2) an inorganic colloid, followed by drying.

According to the present invention, deposition of polymer scale in a polymerization vessel can be effectively prevented, not only on areas in the liquid-phase region but also on areas around the interface between the gas phase and the liquid phase. Therefore, where polymerization is conducted by applying the present invention, the operation of removing polymer scale need not be performed every run of polymerization and, as a result, productivity is improved.

In addition, the polymeric product obtained by application of the present invention can be formed into sheets or the like which have very few fish eyes. Besides, the formed products are good in regard of initial coloration property. More specifically, such formed products have a luminosity index (L value) in the Hunter's color difference equation described in JIS Z 8730 (1980) of, for example, at least 70 in the case of vinyl chloride polymer, and at least 80 in the case of SBR.

Furthermore, the polymer scale preventive agent of the present invention may have water as a major component of solvent, and, therefore, the amount of organic solvent to be used in preparing the agent can be limited to a range such that there is little fear of inflammation, explosion or the like and there is no problem in regard of toxicity or the like.

DETAILED DESCRIPTION OF PREFERRED EMBODIMENTS

Component (A)

The polymer scale preventive agent according to the present invention comprises, as component (A), a condensation product of (A-1) an aromatic compound having at least two amino groups with (A-2) an aromatic tetracarboxylic acid anhydride.

(A-1) Aromatic compound having at least two amino groups

The aromatic compound (A-1) having at least two amino groups ($-NH_2$) includes, for example, the compounds of the following general formulas (1) to (11-2):

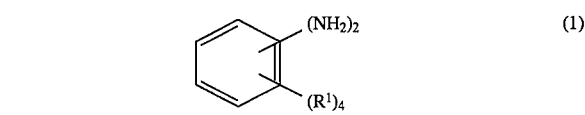

wherein the $R^1$ groups may be the same or different and are each $-H$, $-NH_2$, $-Cl$, $-OH$, $-NO_2$, $-COCH_3$, $-OCH_3$, $-N(CH_3)_2$, $-COOH$, $-SO_3H$ or an alkyl group of from 1 to 3 carbon atoms,

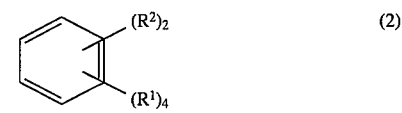

wherein the $R^1$ groups may be the same or different and are as defined above, the $R^2$ groups may be the same or different and are each an amino group-containing alkyl group of from 1 to 10 carbon atoms,

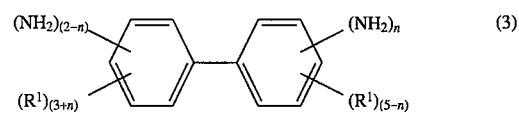

wherein the $R^1$ groups may be the same or different and are as defined above, and n is an integer of 1 or 2,

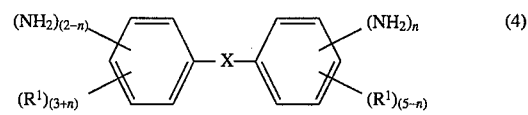

wherein the $R^1$ groups may be the same or different and are as defined above, n is also as defined above, X is an alkylene group of from 1 to 5 carbon atoms, $-CH=CH-$, $-N=N-$, $-NH-$, $-N(CH_3)-$, $-CONH-$, $-P(=O)H-$, $-SO_2-$, $-O-$, $-S-$, $-Si(R)_2-$ (wherein R is an alkyl group of from 1 to 10 carbon atoms), or the group of the formula:

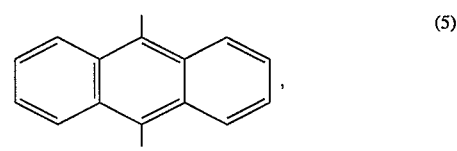

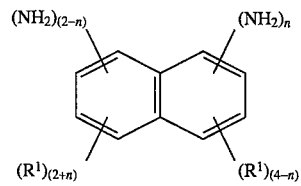

wherein the $R^1$ groups may be the same or different and are as defined above, and n is also as defined above,

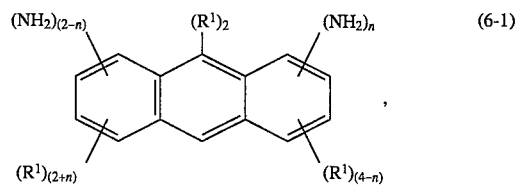

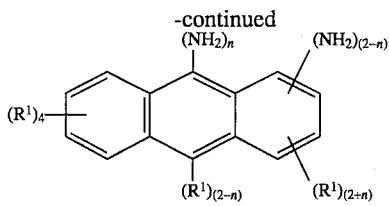

wherein in the formulas (6-1) and (6-2), the $R^1$ groups may be the same or different and are as defined above, and n is also as defined above,

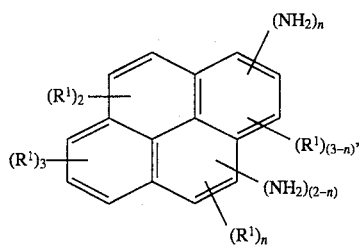

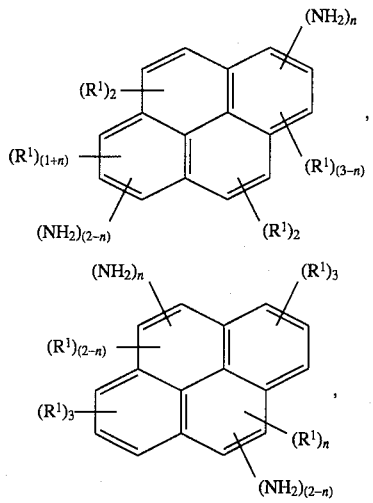

wherein in the formulas (7-1), (7-2) and (7-3), the $R^1$ groups may be the same or different and are as defined above, and n is also as defined above,

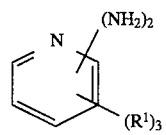 (8)

wherein the $R^1$ groups may be the same or different and are as defined above,

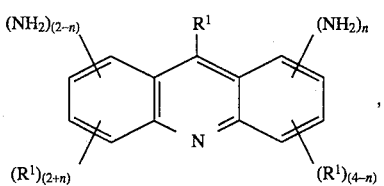

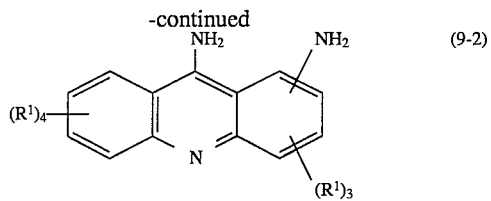

wherein in the formulas (9-1) and (9-2), the $R^1$ groups may be the same or different and are as defined above, and n is also as defined above,

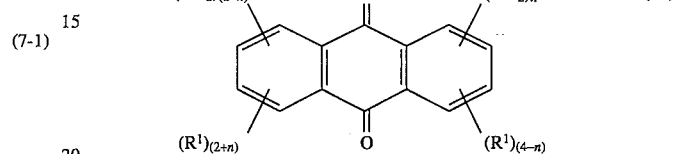

wherein the $R^1$ groups may be the same or different and are as defined above, and n is also as defined above,

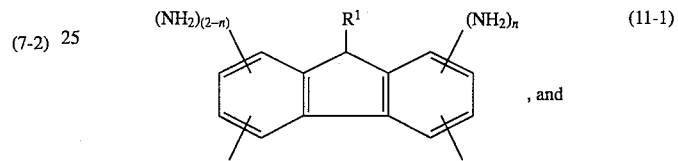

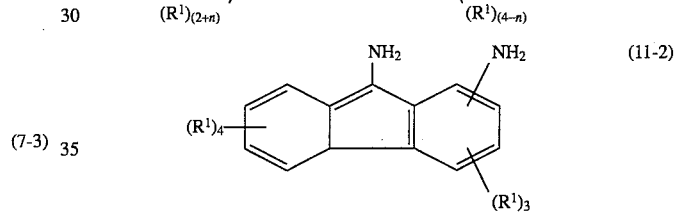

wherein in the formulas (11-1) and (11-2), the $R^1$ groups may be the same or different and are as defined above, and n is also as defined above.

Specific examples of the compounds represented by the above general formulas (1) to (11-2), respectively, will be set forth below.

The compounds of the above general formula (1) include, for example, o-, m- and p-diaminobenzenes, 3,4- and 3,5-diaminobenzoic acids, 2,5-diaminobenzenesulfonic acid, 3,4-diaminochlorobenzene, 3,4-diaminophenol, 1,2-diamino-4-nitrobenzene, 2,4-diamino-1-nitrobenzene, 2,4-, 2,5- and 2,6-diaminotoluenes, 2,5- and 2,6-diamino-m-xylenes, 2,5- and 2,6-diamino-p-xylenes, and the like.

The compounds of the above general formula (2) include, for example, 2,4-bis(β-amino-t-butyl)toluene, p-bis(2-methyl-4-aminopentyl)benzene, p-bis(1,1-dimethyl-5-aminopentyl)benzene, and the like.

The compounds of the above general formula (3) include, for example, 4,4'-diamino-3,3'-biphenyldiol, 3,3'-dimethyl-4,4'-diaminobiphenyl, 3,3'-dimethoxy-4,4'-diaminobiphenyl, 4,4'-diaminobiphenyl, and the like.

The compounds of the above general formula (4) include, for example, 2,4-diaminoazobenzene, 4,4'-diaminodiphenyl ether, 4,4'-diaminodiphenylamine, 4,4'-diaminodiphenylmethane, 3,3'- and 4,4'-diaminodiphenyl sulfones, 4,4'-diaminobenzanilide, 4,4'-diaminostilbene, 4,4'-diaminostilbene-2,2'-disulfonic acid, 9,10-bis(4-aminophenyl)anthracene, 4,4'-diaminodiphenyl sulfide, 4,4'-diaminodiphenylpropane, bis(4-aminophenyl)diethylsilane, bis(4-aminophenyl)phosphine oxide, bis(4 -aminophenyl)-N-methylamine, and the like.

The compounds of the above general formula (5) include, for example, 1,5- and 1,8-diaminonaphthalenes, and the like.

The compounds of the above general formulas (6-1) and (6-2) include, for example, 1,4- and 1,5-diaminoanthracenes, and the like.

The compounds of the above general formulas (7-1) to (7-3) include, for example, 1,6-, 1,8-, 3,5- and 5,10-diaminopyrenes, and the like.

The compounds of the above general formula (8) include, for example, 2,3-, 3,4- and 2,6-diaminopyridines, and the like.

The compounds of the above general formulas (9-1) and (9-2) include, for example, 3,6-diaminoacridine and the like.

The compounds of the above general formula (10) include, for example, 1,2-, 1,4- and 2,6-diaminoanthraquinones and the like.

The compounds of the above general formulas (11-1) and (11-2) include, for example, 2,3- and 2,7-diaminofluorenes and the like.

Among the above compounds applicable as the component (A), preferred are 3,5-diaminobenzoic acid, 2,5-diaminobenzenesulfonic acid, 4,4'-diamino-3,3'-biphenyldiol, 4,4'-diaminodiphenyl ether, 4,4'-diaminodiphenylamine, 4,4'-diaminodiphenylmethane, 3,3'- and 4,4'-diaminodiphenyl sulfones, 4,4'-diaminobenzanilide, 4,4'-diaminostilbene-2,2'-disulfonic acid, 4,4'-diaminodiphenylpropane, 2,6-diaminopyridine, and 2,7-diaminofluorene.

The above aromatic compounds (A-1) having at least two amino groups may be used either singly or in combination of two or more.

(A-2) Aromatic tetracarboxylic acid anhydride

The aromatic tetracarboxylic acid anhydride (A-2) includes, for example, pyromellitic anhydrides, 2,2-bis(3,4-dicarboxyphenyl)propane dianhydride, 2,3,6,7-naphthalenetetracarboxylic dianhydride, bis(3,4-dicarboxyphenyl) sulfone dianhydride, 3,3',4,4'-biphenyltetracarboxylic dianhydride, 3,4,9,10-perylenetetracarboxylic dianhydride, 1,2,5,6-naphthalenetetracarboxylic dianhydride, bis(3,4-dicarboxyphenyl) ether dianhydride, 2,2',3,3'-biphenyltetracarboxylic dianhydride, 3,3',4,4'-benzophenonetetracarboxylic dianhydride, 2,3,4,5-thiophenonetetracarboxylic dianhydride, 2,2',6,6'-biphenyltetracarboxylic dianhydride, and the like.

Among these, preferred are pyromellitic anhydride, 1,2,5,6-naphthalenetetracarboxylic dianhydride, 2,3,6,7-naphthalenetetracarboxylic dianhydride, and 2,2',6,6'-biphenyltetracarboxylic dianhydride.

The aromatic tetracarboxylic acid anhydrides (A-2) as above may be used either singly or in combination of two or more.

Condensation reaction

The condensation reaction between the aromatic compound (A-1) having at least two amino groups and the aromatic tetracarboxylic acid anhydride (A-2) as abovedescribed may be carried out in a suitable organic solvent-based medium, normally at a temperature of from room temperature to about 100° C. for a time of 0.5 to 300 hours, preferably at a temperature of from room temperature to 50° C. for 1 to 100 hours.

As the medium for the condensation reaction, organic solvents may be used. The organic solvents usable include, for example, alcohol solvents such as methanol, ethanol, propanol, butanol, 2-butanol, 2-methyl-1-propanol, 2-methyl-2-propanol, 3-methyl-1-butanol, 2 -methyl-2-butanol, 2-pentanol and the like; ketone solvents such as acetone, dioxane, methyl ethyl ketone, methyl isobutyl ketone and the like; ester solvents such as methyl formate, ethyl formate, methyl acetate, methyl acetoacetate and the like; ether solvents such as 4-methyldioxolan, diethyl ether, ethylene glycol diethyl ether and the like; chlorinated-hydrocarbon solvents such as methylene chloride, chloroform, carbon tetrachloride, trichloroethylene, perchloroethylene and the like; hydrocarbon solvents such as n-heptane, n-hexane and the like; furans such as tetrahydrofuran and the like; aprotic solvents such as dimethyl formamide, dimethyl acetamide, dimethyl sulfoxide, dimethyl sulfone, acetonitrile, N-methylpyrrolidone and the like; m-cresol, and so forth. These solvents may be used either singly or as a mixed solvent of two or more thereof.

Although the amounts of the aromatic compound (A-1) having at least two amino groups and the aromatic tetracarboxylic acid anhydride (A-2) to be used for preparation of the condensation product (A) depend on the kinds of the components (A-1) and (A-2) and of the solvent used, reaction temperature, reaction time, etc., normally the component (A-2) is preferably used in an amount of 0.01 to 5 parts by weight, more preferably 0.1 to 3 parts by weight, per part by weight of the component (A-1). If the amount of the aromatic tetracarboxylic acid anhydride (A-2) is too small or too large, the resulting condensation product is poor in polymer scale preventing effect when formulated into the polymer scale preventive agent.

For the preparation of the polymer scale preventive agent, which will be described later, the condensation reaction mixture containing the condensation product (A) upon completion of the above condensation reaction may be used as it is. Alternatively, the condensation product (A) may be separated from the reaction mixture before being used for the preparation of the agent. Separation of the condensation product (A) from the reaction mixture can be readily achieved by filtration where the condensation product has separated out of the reaction mixture. Where the condensation product is in the state of solution in the solvent (reaction medium), on the other hand, the solution may be added dropwise to a poor solvent such as water, thereby causing the condensation product to separate out, followed by filtration.

Component (B)

In addition to the above condensation product (A), the polymer scale preventive agent of the present invention comprises, as component (B), at least one member selected from the group consisting of (B-1) a water-soluble polymeric compound and (B-2) an inorganic colloid. These components (B-1) and (B-2) have a function to enhance the polymer scale preventing effect. Preferably, the components (B-1) and (B-2) are used together. The components (B-1) and (B-2) will, presumably, interact with the condensation product to produce either an effect of improving the hydrophilicity of a surface to be coated with the polymer scale preventive agent (in the case of the component (B-1)) or an effect of strengthening the adhesion of the agent to polymerization-vessel inner wall surfaces and the like (in the case of the component (B- 2)).

(B-1) Water-soluble polymeric compound

The water-soluble polymeric compound (B-1) includes, for example, amphoteric polymeric compounds such as gelatin, casein and the like; anionic polymeric compounds such as polyacrylic acid, polystyrenesulfonic acid, carboxymethyl cellulose, alginic acid and the like; cationic nitrogen-containing polymeric compounds such as polyvinyl pyrrolidone, polyacrylamide and the like; hydroxyl group-containing polymeric compounds such as polyvinyl alcohol, hydroxyethyl cellulose, hydroxypropyl cellulose, pectin and the like; and so forth.

Among the water-soluble polymeric compounds (B-1) as above, preferred are gelatin, casein, polyacrylic acid, carboxymethyl cellulose, polyvinyl pyrrolidone and pectin.

The component (B-1) is normally added in an amount of from 1 to 1000 parts by weight, preferably from 5 to 200 parts by weight, per 100 parts by weight of the condensation product (A).

The water-soluble polymeric compounds (B-1) as above may be used either singly or in combination of two or more.
(B-2) Inorganic colloid The inorganic colloids (B-2) is a particulate colloid prepared by a dispersing method using water as a dispersion medium or by a condensing method, the colloidal particles ranging from 1 to 500 μm in size.

Specifically, the inorganic colloids include, for example, colloids of an oxide, a hydroxide or a mixture thereof, the oxide and hydroxide being those of a metal selected from the group consisting of aluminum, thorium, titanium, zirconium, antimony, tin, iron and the like; colloids of tungstic acid, vanadium pentoxide, gold and silver; silver iodide sol; and colloids of selenium, sulfur, silica and the like. Among these, preferred are colloids of an oxide, a hydroxide or a mixture thereof, the oxide and hydroxide being those of a metal selected from the group consisting of aluminum, titanium, zirconium, tin and iron, as well as colloidal silica.

The component (B-2) is normally added in an amount of from 1 to 1000 parts by weight, preferably from 5 to 500 parts by weight, per 100 parts by weight of the condensation product (A).

The inorganic colloids (B-2) as above may be used either singly or in combination of two or more.

As has been described above, the component (B) preferably comprises both the water-soluble polymeric compound (B-1) and the inorganic colloid (B-2). In such a case, the inorganic colloid (B-2) is preferably used in an amount of from 5 to 3000 parts by weight, more preferably from 50 to 1000 parts by weight, per 100 parts by weight of the water-soluble polymeric compound (B-1).
Preparation of polymer scale preventive agent The polymer scale preventive agent according to the present invention comprises an alkaline solution containing the above-described component (A) and component (B). The polymer scale preventive agent is applied to polymerization vessel inner wall surfaces or the like, and is dried to form a coating, whereby polymer scale can be prevented from being deposited on the polymerization vessel inner wall or the like.

The polymer scale preventive agent can be prepared, for example, by adding a solvent, which will be described below, to the aforementioned components (A) and (B), mixing them, and controlling the pH of the resulting mixture to the alkaline side.

Because the polymer scale preventive agent of the present invention is alkaline, improved solubility of the above-described condensation product in the solvent is ensured. Therefore, the polymer scale preventive agent can be obtained as a uniform solution and, accordingly, can form a uniform coating when applied to the inner wall, etc. of a polymerization vessel. Presumably, it is due to this uniformity that an improved scale preventing effect can be obtained by use of the scale preventive agent of the present invention. Further, it is preferable that the polymer scale preventive agent of the present invention has a pH of 7.5 to 13.5, particularly a pH of 8.0 to 12.5. Alkaline compound is for use in the control of pH include, for example, alkali metal compounds such as LiOH, NaOH, KOH, $Na_2CO_3$, $Na_2HPO_4$ and the like; ammonium compound such as $NH_4OH$ and the like; and organic amine compounds such as ethylenediamine, monoethanolamine, triethanolamine and so forth.

Solvents which can be used for preparing the polymer scale preventive agent include, for example, water; alcohol solvents such as methanol, ethanol, propanol, butanol, 2-butanol, 2-methyl-1-propanol, 2-methyl-2-propanol, 3-methyl-1-butanol, 2-methyl-2-butanol, 2-pentanol and the like; ketone solvents such as acetone, methyl ethyl ketone, methyl isobutyl ketone and the like; ester solvents such as methyl formate, ethyl formate, methyl acetate, ethyl acetate, methyl acetoacetate and the like; ether solvents such as 4-methyldioxolan, ethylene glycol diethyl ether and the like; furans; aprotic solvents such as dimethyl formamide, dimethyl sulfoxide, acetonitrile, and so forth. These may be used singly or as a mixed solvent of two or more thereof on a case-by-case basis.

Among the above solvents, preferred are water and mixed solvents of water and an organic solvent miscible with water. The organic solvents miscible with water include, for example, alcohols such as methanol, ethanol, propanol, etc.; ketones such as acetone, methyl ethyl ketone, etc.; and esters such as methyl acetate, ethyl acetate, etc. The mixed solvents of water and an organic solvent miscible with water preferably contain the organic solvent in such an amount that there is no fear about inflammation, explosion or the like and safety in handling is ensured as to virulence, etc. Specifically, the amount of the organic solvent is preferably 50% by weight or less, and more preferably 30% by weight or less.

The concentration of the condensation product (A) in the polymer scale preventive agent is not specifically limited as long as a total coating weight described later can be obtained. Normally, the concentration is in the range of about 0.001 to about 5% by weight, preferably about 0.01 to about 1% by weight.
Formation of coating The polymer scale preventive agent prepared as described above is used for forming a coating on inner wall surfaces of a polymerization vessel. For formation of the coating, the agent is first applied to the inner wall surfaces of the polymerization vessel and then dried sufficiently at a temperature ranging, for example, from room temperature to 100° C., optionally followed by washing with water if necessary.

Preferably, the coating is formed not only on the inner wall surfaces of a polymerization vessel but also on other areas with which the monomer comes into contact during polymerization. For example, on an stirring shaft, stirring blades, baffles, condensers, headers, search coil, bolts, nuts, etc.

More preferably, the coating is further provided on areas with which the monomer does not come into contact during polymerization but on which polymer scale may be deposited, for example, areas with which unreacted monomer comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the scale preventing agent to the inner wall surfaces of a polymerization vessel, etc. is not particularly restricted, and includes, for example, the brush coating, spray coating, the method by filling the polymerization vessel with the scale preventive agent followed by withdrawal thereof, and automatic coating methods as disclosed in Japanese Pre-examination Patent Publication (KOKAI) Nos. 57-61001 (1982) and 55-36288 (1980), and Japanese Patent Publication (KOHYO) Nos. 56-501116 (1981) and 56-501117 (1981), and Japanese Pre-examination Publication (KOKAI) No. 59-11303 (1984), etc.

The method of drying wet coated surfaces provided by application of the polymer scale preventive agent, is not restricted, either. Following methods can be used. That is, a method in which, after the agent is applied, hot air with a suitable elevated temperature is blown to the coated surface, and a method in which the inner wall surfaces of a polymerization vessel and the surfaces of other parts to be coated are previously heated, for example, to a temperature of 30° to 80° C., and the polymer scale preventive agent is directly applied to the heated inner wall surfaces, etc. After dried, the coated surfaces are washed with water if necessary.

The coating thus obtained has a coating weight after dried of normally 0 001 to 5 g/m$^2$, and preferably from 0.05 to 2 g/m$^2$.

The formed coating has good durability and retains the scale-preventing action; therefore, it is unnecessary for the above-described coating operation to be carried out every batch of polymerization. Hence, productivity is improved.

Polymerization

After the formation of the coating on the inner wall surfaces of a polymerization vessel, and preferably also on other areas with which monomer may come into contact during polymerization, etc. by the coating operation as above, polymerization is carried out in accordance with conventional procedures. That is, a monomer having an ethylenically unsaturated double bond, a polymerization initiator (catalyst), and optionally a polymerization medium such as water, etc., a dispersing agent such as suspending agents, solid dispersing agents, nonionic or anionic emulsifying agents, etc., and the like are charged into the polymerization vessel, and then polymerization is carried out according to conventional procedures.

The monomers having an ethylenically unsaturated double bond which can be polymerized by applying the process of the present invention include, for example, vinyl halides such as vinyl chloride and the like; vinyl esters such as vinyl acetate, vinyl propionate and the like; acrylic acid, methacrylic acid, and their esters and salts; maleic acid, fumaric acid, and their esters and anhydrides; diene monomers such as butadiene, chloroprene, isoprene and the like; styrene; acrylonitrile; vinylidene halides; vinyl ethers; and so forth. These may be used either singly or in combination of two or more.

There are no particular restrictions on the type of polymerization to which the process according to the present invention can be applied. That is, the process of the present invention is effective in any of such polymerization types as suspension polymerization, emulsion polymerization, solution polymerization; bulk polymerization, and gas phase polymerization. Particularly, the process of the present invention is more suited to polymerizations in an aqueous medium, such as suspension polymerization and emulsion polymerization.

In the following, taking the cases of suspension polymerization and emulsion polymerization as an example, general procedures of polymerization will be described.

First, water and a dispersing agent are charged into a polymerization vessel. Subsequently, the polymerization vessel is evacuated to reduce the internal pressure to a value of 0.1 to 760 mmHg, and a monomer is then charged. Upon the charging of the monomer, the internal pressure usually takes a value of from 0.5 to 30 kgf/cm$^2$.G. A polymerization initiator is placed into the polymerization vessel either before and/or after the monomer charging. Thereafter, polymerization is carried out at a reaction temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel has fallen to a value of 0 to 7 kgf/cm$^2$.G or when cooling water which is let flow into and out of a jacket provided around the polymerization vessel has come to show approximately equal inlet and outlet temperatures (i.e., when liberation of heat due to polymerization reaction has subsided). The amounts of the water, dispersing agent and polymerization initiator to be charged for polymerization are 20 to 500 parts by weight, 0.01 to 30 parts by weight, and 0.01 to 5 parts by weight, respectively, per 100 parts by weight of the monomer.

In solution polymerization, an organic solvent such as toluene, xylene, pyridine, etc. is used as the polymerization medium, in place of water. A dispersing agent may be used, if necessary. The other conditions for polymerization are generally the same as those described for suspension and emulsion polymerizations.

In bulk polymerization, after a polymerization vessel is evacuated to a pressure of from about 0.01 mmHg to about 760 mmHg, a monomer and a polymerization initiator are charged into the polymerization vessel, and then polymerization is carried out at a reaction temperature of from −10° C. to 250° C. For example, the reaction temperature is 30° to 80° C. for polymerization of vinyl chloride, and is 50° to 150° C. for polymerization of styrene.

Where polymerization is carried out by applying the process of the present invention, it is possible to prevent polymer scale from being deposited, regardless of the materials of the inner wall, etc. of a polymerization vessel. For example, where the polymerization vessel is made of a steel (such as a stainless steel) or the like as well as where the polymerization vessel is a glass-lined one, the polymer scale deposition can be prevented from occurring during polymerization.

Those additive materials which are conventionally added in polymerization systems can be used without any limitations. That is to say, the process of the present invention can effectively prevent polymer scale deposition in polymerization systems which may contain additive materials including, for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide, etc.; suspending agents comprised of, for example, natural or synthetic polymeric compounds such as partially saponified polyvinyl alcohols, polyacrylic acids, vinyl acetate/maleic anhydride copolymers, cellulose derivatives (e.g. hydroxypropyl methyl cellulose), pyrogallol-acetone resins, etc.; solid dispersing agents such as calcium phosphate, hydroxyapatite, etc.; nonionic emulsifying agents such as sorbitan monolaurate, sorbitan trioleate, polyoxyethylene alkyl ether, etc.; anionic emulsifying agents such as sodium lauryl sulfate, sodium alkylbenzenesulfonates (e.g. sodium dodecylbenzenesulfonate), sodium dioctylsulfosuccinate, etc.; fillers such as calcium carbonate, titanium oxide, etc.; stabilizers such as tribasic lead sulfate, calcium stearate, dibutyltin dilaurate, dioctyltin mercaptide, etc.; lubricants such as rice wax, stearic acid, cetyl alcohol, etc.; plasticizers such as DOP, DBP, etc.; chain transfer agents such as mercaptans (e.g. t-dodecyl mercaptan), trichloroethylene, etc.; pH adjusters, and so forth.

Besides, the polymer scale preventive agent according to the present invention may also be added to the polymerization medium. For example, in addition to being used for formation of the coating on the inner wall surfaces, etc. of the polymerization vessel, the polymer scale preventive agent may be added to the polymerization medium in a small amount. Where the polymer scale preventive agent is thus added to the polymerization medium, a greater effect of preventing polymer scale deposition can be obtained, as compared with the case where the agent is used only in the coating treatment. The amount of the polymer scale preventive agent to be added to the polymerization medium, if such addition is employed, suitably ranges from about 10 to about 1000 ppm based on the total weight of the monomer or monomers charged into the polymerization vessel. At the time of adding the polymer scale preventive agent, care should be taken not to affect adversely the fish eye, bulk specific gravity, particle size distribution or other qualities of the resulting polymeric product.

acetone solution of pyromellitic anhydride. These acetone solutions were placed into a 3-liter autoclave, and were mixed to permit reaction at room temperature for 10 hours. The resulting condensation product, which separated out in the reaction mixture, was then filtered off and was vacuum dried at room temperature. The product thus obtained will hereinafter referred to as condensation product No. 1.

Preparation of condensation product Nos. 2 to 10

Condensation product Nos. 2 to 10 were prepared in the same manner as in the above preparation of the condensation product No. 1, except that an aromatic compound having at least two amino groups (A-1), an aromatic tetracarboxylic acid anhydride (A-2) and a solvent as given in Table 1 were used.

Table 1 shows the total amount (in moles) of (A-1)+(A-2), molar ratio of (A-1):(A-2), reaction temperature, and reaction time.

TABLE 1

| Condensation product No. | (A-1) Aromatic compound having at least two amino groups | (A-2) Aromatic tetracarboxylic acid anhydride | Total of (A-1) + (A-2) (moles) | (A-1):(A-2) (mol. ratio) | Solvent | Reaction temp. (°C.) | Reaction time (hr) |
|---|---|---|---|---|---|---|---|
| 1 | 4,4'-Diaminodiphenylmethane | Pyromellitic anhydride | 0.45 | 1:0.5 | Dimethylformamide | Room temp. | 20 |
| 2* | 4,4'-Diaminodiphenylmethane | — | 1 | — | Dimethylformamide | Room temp. | 20 |
| 3* | — | Pyromellitic anhydride | 1 | — | Dimethylformamide | Room temp. | 20 |
| 4 | 4,4'-Diaminodiphenyl ether | 2,3,6,7-Naphthalenetetracarboxylic dianhydride | 1 | 1:0.5 | Dimethylformamide | Room temp. | 20 |
| 5 | 4,4'-Diaminobenzanilide | 3,3',4,4'-Benzophenonetetracarboxylic dianhydride | 1 | 1:2 | Acetonitrile | Room temp. | 20 |
| 6 | 4,4'-Diaminobenzanilide | 3,3',4,4'-Biphenyltetracarboxylic dianhydride | 1 | 1:0.5 | Acetonitrile | Room temp. | 20 |
| 7 | 4,4'-Diaminodiphenyl sulfide | 3,3',4,4'-Biphenyltetracarboxylic dianhydride | 1 | 1:0.5 | Acetonitrile | Room temp. | 20 |
| 8 | 4,4'-Diaminodiphenylpropane | 3,3',4,4'-Biphenyltetracarboxylic dianhydride | 1 | 1:0.5 | Dimethylformamide | Room temp. | 20 |
| 9 | 2,7-Diaminofluorene | 3,3',4,4'-Biphenyltetracarboxylic dianhydride | 1 | 1:0.5 | Dimethylformamide | Room temp. | 20 |
| 10 | 4,4'-Diamino-3,3'-biphenyldiol | 3,3',4,4'-Biphenyltetracarboxylic dianhydride | 1 | 1:0.5 | Dimethylformamide | Room temp. | 20 |

EXAMPLES

The present invention will now be described in detail below with reference to working examples thereof and comparative examples. In the tables below, the experiments bearing a No. marked with * are comparative examples, and the other experiments, bearing a non-marked No., are working examples of the present invention.

Preparation of condensation product No. 1

Acetone was added to 0.3 mol of 4,4'-diaminodiphenylmethane, followed by stirring at room temperature to obtain an acetone solution of 4,4'-diaminodiphenylmethane. Also, acetone was added to 0.15 mol of pyromellitic anhydride and they were stirred at room temperature, to give an Example 1

(Experiment Nos. 101 to 110)

In each experiment, a stainless-steel polymerization vessel having an internal capacity of 1000 liters and equipped with a stirrer was used to carry out polymerization in the manner as follows.

In each experiment, a polymer scale preventive agent was prepared by using the condensation product (A), water-soluble polymeric compound (B-1), inorganic colloid (B-2), solvent and alkaline compound as set forth in Table 2, in such amounts as to give the total concentration of (A)+(B-1)+(B-2), weight ratio of (A):(B-1):(B-2), solvent composition, and pH as shown in Table 2. Inorganic colloids (a to g, in Tables 2 and 5) used in this Example 1 and in Example 2, described later, are as given in Table 4. The polymer scale preventive agent was applied to the inner wall of the polymerization vessel and to the stirring shaft, stirring blades and other areas with which the monomer comes into contact during polymerization. The agent applied was dried by heating at 40° C. for 15 minutes to form a coating, followed by washing the inside of the polymerization vessel with water.

Subsequently, in each experiment, the polymerization vessel provided with the coating by the coating treatment as above was charged with 400 kg of water, 200 kg of vinyl chloride, 250 g of partially saponified polyvinyl alcohol, 25 g of hydroxypropyl methyl cellulose and 70 g of 3,5,5-trimethylhexanoyl peroxide, followed by polymerization with stirring at 66° C. for 6 hours. After the polymerization was finished, the polymeric product and unreacted monomer were recovered, and the inside of the polymerization vessel was washed with water to remove residual resin.

Thereafter, the same process as above including the polymerization and the washing of the inside of polymerization vessel with water but omitting the coating operation was repeated batch-wise, the repetition number of batch being given in Table 3.

After the final batch was over, in each experiment, the amount of polymer scale deposited on areas located in the liquid-phase region and that on areas around the interface between gas and liquid phases inside the polymerization vessel were determined according to the method described below. The results are given in Table 3.

Measurement of the amount of polymer scale deposited

The scale deposited in an area of 10 cm square at a predetermined location on the inner wall of a polymerization vessel is scraped off with a stainless steel spatula as completely as can be confirmed with the naked eye, and then the scraped scale is weighed on a balance. The measured value is multiplied by 100 to obtain the amount of the deposited polymer scale per area of 1 m$^2$.

In addition, the number of fish eyes appearing upon formation of a polymer into a sheet was determined, according to the method below, for the polymers obtained in these experiments. The results are given in Table 3.

Measurement of fish eyes

A hundred (100) parts by weight of the polymer obtained, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The obtained sheet is examined for the number of fish eyes per 100 cm$^2$ by light transmission.

Furthermore, in order to evaluate the quality of the polymers obtained in the experiments as to initial coloration upon formation into sheet, measurement of luminosity index (L value) was carried out according to the method below. The results are given in Table 3.

Measurement of luminosity index (L value)

A hundred (100) parts by weight of the obtained polymer, 1 part by weight of a tin laurate stabilizing agent (TS-101, product of Akisima Chemical Co.) and 0.5 part by weight of a cadmium stabilizing agent (C-100J, product of Katsuta Kako Co.), and 50 parts by weight of dioctyl phthalate as a plasticizer are kneaded at 160° C. for 5 minutes with a twin roll mill, and then formed into a sheet 1 mm thick. Subsequently, this sheet is placed in a mold measuring 4×4×1.5 cm, heated at 160° C. under a pressure of 65 to 70 kgf/cm$^2$ for 0.2 hour and press molded under the same conditions to prepare a test specimen. This test specimen is measured for luminosity index L in the Hunter's color difference equation described in JIS Z 8730 (1980). The greater the value of L, the higher the whiteness evaluated, namely, the slighter the initial coloration evaluated.

The value of L is determined as follows.

The stimulus value Y of XYZ color system is determined by the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition of illumination and light reception, the condition d defined in section 4.3.1 of JIS Z 8722 is adopted. From the stimulus value Y obtained, the L value is calculated based on the equation: $L=10Y^{1/2}$ described in JIS Z 8730 (1980).

TABLE 2

| Exp. No. | Condensation product No. (A) | Water-soluble polymeric compound (B-1) | Inorganic colloid (B-2) | Total conc. of (A) + (B-1) + (B-2) (wt. %) | (A):(B-1):(B-2) (wt. ratio) | Alkaline compound | pH | Solvent (weight ratio) | |
|---|---|---|---|---|---|---|---|---|---|
| 101 | 1 | Gelatin | b | 0.5 | 100:50:100 | Ethylenediamine | 11.5 | Water:Methanol | (90:10) |
| 102* | 2* | Gelatin | b | 0.5 | 100:50:100 | Ethylenediamine | 11.5 | Water:Methanol | (90:10) |
| 103* | 3* | Gelatin | b | 0.5 | 100:50:100 | Ethylenediamine | 11.5 | Water:Methanol | (90:10) |
| 104 | 4 | Polyvinyl pyrrolidone | c | 0.5 | 100:50:200 | Ethylenediamine | 11.5 | Water:Methanol | (90:10) |
| 105 | 5 | Polyvinyl pyrrolidone | d | 0.5 | 100:50:300 | Ethylenediamine | 11.5 | Water:Methanol | (90:10) |
| 106 | 6 | Polyvinyl alcohol | d | 0.5 | 100:100:100 | Ethylenediamine | 11.5 | Water:Methanol | (90:10) |
| 107 | 7 | Polyvinyl alcohol | e | 0.5 | 100:150:100 | Ethylenediamine | 11.5 | Water:Methanol | (80:20) |
| 108 | 8 | Hydroxyethyl cellulose | f | 0.5 | 100:200:100 | NaOH | 12.0 | Water:Acetone | (80:20) |
| 109 | 9 | Pectin | g | 0.5 | 100:50:100 | NaOH | 12.0 | Water:Methanol | (70:30) |
| 110 | 10 | Casein | g | 0.3 | 100:150:200 | NaOH | 12.0 | Water:Isobutanol | (90:10) |

TABLE 3

| Exp. No. | Repetition Number of batch (batches) | Results of polymerization | | | Luminosity index (L value) |
|---|---|---|---|---|---|
| | | Polymer scale amount (g/m$^2$) | | Number of fish eyes | |
| | | Liquid phase | Around interface of gas and liquid phases | | |
| 101 | 5 | 0 | 4 | 3 | 73 |
| 102* | 2 | 22 | 850 | 39 | 73 |
| 103* | 2 | 24 | 880 | 40 | 73 |
| 104 | 5 | 0 | 5 | 4 | 73 |
| 105 | 5 | 0 | 4 | 3 | 73 |
| 106 | 5 | 0 | 4 | 3 | 73 |
| 107 | 5 | 0 | 4 | 3 | 73 |
| 108 | 5 | 0 | 5 | 3 | 73 |
| 109 | 5 | 0 | 4 | 3 | 73 |
| 110 | 4 | 0 | 5 | 4 | 73 |

TABLE 4

| | Diameter of colloidal particles (mμ) | Name of article | Manufacturer |
|---|---|---|---|
| a | 10–20 | Snowtex 0 (colloidal silica) | Nissan Chemical Industries, Ltd. |
| b | 5–7 | Snowtex CXS-9 (colloidal silica) | Nissan Chemical Industries, Ltd. |
| c | 100–200 | Titanium oxide | Nissan Chemical Industries, Ltd. |
| d | 10–20 | Aluminum oxide | Nissan Chemical Industries, Ltd. |
| e | 60–70 | Zirconium oxide | Nissan Chemical Industries, Ltd. |
| f | 20–50 | Tin oxide | Nissan Chemical Industries, Ltd. |
| g | 10–15 | Iron hydroxide | produced by the present inventors |

Example 2

(Experiment Nos. 201 to 210)

In each experiment, a stainless-steel polymerization vessel having an internal capacity of 20 liters and equipped with a stirrer was used to carry out polymerization in the manner as follows.

In each experiment, a polymer scale preventive agent was prepared by using the condensation product (A), water-soluble polymeric compound (B-1), inorganic colloid (B-2), solvent and alkaline compound as set forth in Table 5, in such amounts as to give the total concentration of (A)+(B-1)+(B-2), weight ratio of (A):(B-1):(B-2), solvent composition, and pH as shown in Table 5. The polymer scale preventive agent was applied to the inner wall of the polymerization vessel and to the stirring shaft, stirring blades and other areas with which the monomer comes into contact during polymerization. The agent applied was dried by heating at 40° C. for 15 minutes to form a coating, followed by washing the inside of the polymerization vessel with water.

Subsequently, in each experiment, the polymerization vessel thus coated was charged with 9 kg of water, 225 g of sodium dodecylbenzenesulfonate, 12 g of t-dodecyl mercaptan and 13 g of potassium peroxodisulfate. The inside atmosphere of the polymerization vessel was replaced with nitrogen gas, thereafter 1.3 kg of styrene and 3.8 kg of butadiene were charged into the vessel, and polymerization was carried out at 50° C. for 20 hours. After the polymerization was completed, the polymeric product and unreacted monomers were recovered, followed by washing the inside of the vessel with water to remove residual resin.

Thereafter, the same process as above including the polymerization and the washing of the inside of polymerization vessel with water but omitting the coating operation was repeated batch-wise, the repetition number of batch being given in Table 6.

After the final batch was over, in each experiment, the amount of polymer scale deposited on areas located in the liquid-phase region and that on areas around the interface between gas and liquid phases inside the polymerization vessel were determined according to the same method as in Example 1. The results are given in Table 6.

Besides, in order to evaluate the quality of the polymers obtained in the experiments as to initial coloration upon formation into sheet, measurement of luminosity index (L value) was carried out according to the method below. The results are given in Table 6.

Measurement of luminosity index (L value)

To 1 kg of the polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin.

The resin was placed in a mold measuring 9×9× 0.1 cm (depth), heated at 195° C. under a pressure of 50 to 60 kgf/cm$^2$ for 0.2 hour and press molded under a final pressure of 80 kgf/cm$^2$ to prepare a test specimen. This test specimen was measured for luminosity index L in the same manner as in Example 1.

TABLE 5

| Exp. No. | Condensation product No. (A) | Water-soluble polymeric compound (B-1) | Inorganic colloid (B-2) | Total conc. of (A) + (B-1) + (B-2) (wt. %) | (A):(B-1):(B-2) (wt. ratio) | Alkaline compound | pH | Solvent (weight ratio) | |
|---|---|---|---|---|---|---|---|---|---|
| 201 | 1 | Polyacrylic acid | a | 0.5 | 100:100:100 | Ethylenediamine | 11.5 | Water:Methanol | (70:30) |
| 202* | 2* | Polyacrylic acid | a | 0.5 | 100:100:100 | Ethylenediamine | 11.5 | Water:Methanol | (70:30) |
| 203* | 3* | Polyacrylic acid | a | 0.5 | 100:100:100 | Ethylenediamine | 11.5 | Water:Methanol | (70:30) |
| 204 | 4 | Polyacrylic acid | b | 0.5 | 100:50:100 | Ethylenediamine | 11.5 | Water:Methanol | (70:30) |
| 205 | 5 | Na salt of carboxymethyl cellulose | b | 0.5 | 100:50:100 | Ethylenediamine | 11.5 | Water:Methanol | (70:30) |
| 206 | 6 | Na salt of carboxymethyl cellulose | b | 0.5 | 100:100:200 | Ethylenediamine | 11.5 | Water:Methanol | (70:30) |
| 207 | 7 | Polystyrenesulfonic acid | c | 0.5 | 100:100:200 | Ethylenediamine | 11.5 | Water:Methanol | (80:20) |
| 208 | 8 | Polystyrenesulfonic acid | d | 0.5 | 100:100:300 | NaOH | 12.0 | Water:Acetone | (80:20) |
| 209 | 9 | Gelatin | f | 0.5 | 100:200:300 | NaOH | 12.0 | Water:Methanol | (90:10) |
| 210 | 10 | Gelatin | g | 0.3 | 100:50:300 | NaOH | 12.0 | Water:Methanol | (90:10) |

TABLE 6

| | Repetition | Results of polymerization | | |
|---|---|---|---|---|
| | Number of | Polymer scale amount (g/m²) | | Luminosity |
| Exp. No. | batch (batches) | Liquid phase | Around interface of gas and liquid phases | index (L value) |
| 201 | 5 | 0 | 8 | 85 |
| 202* | 2 | 30 | 350 | 85 |
| 203* | 2 | 33 | 340 | 85 |
| 204 | 5 | 0 | 8 | 85 |
| 205 | 5 | 0 | 8 | 85 |
| 206 | 5 | 0 | 7 | 85 |
| 207 | 4 | 0 | 8 | 85 |
| 208 | 4 | 0 | 8 | 85 |
| 209 | 4 | 0 | 8 | 85 |
| 210 | 4 | 0 | 9 | 85 |

Example 3

A stainless-steel polymerization vessel having an internal capacity of 100 liters and equipped with a stirrer was used.

The polymer scale preventive agent used in Experiment No. 201 of Example 2 was applied to the inner wall, the stirring shaft, the stirring blades and other areas with which a monomer during polymerization comes into contact of the polymerization vessel, and was dried by heating at 50° C. for 15 minutes to form a coating, followed by washing the inside of the vessel with water.

Then, the polymerization vessel thus provided with the coating was charged with 40 kg of water, 500 g of disproportionated potassium rhodinate, 13 kg of polybutadiene latex (solid content: 45%), 9 kg of styrene monomer, 5 kg of acrylonitrile monomer, 40 g of t-dodecyl mercaptan and 140 g of cumene hydroperoxide. Further, 200 g of grape sugar, 2 g of ferrous sulfate and 100 g of sodium pyrophosphate were charged into the polymerization vessel while the temperature inside the polymerization vessel was maintained at 47° C. Subsequently, the inside temperature was raised to 65° C., and the reaction mixture in the vessel was brought to polymerization under stirring for 4 hours.

After the polymerization was over, the polymeric product and unreacted monomers were recovered, and the inside of the polymerization vessel was washed with water to remove residual resin.

Thereafter, the same process as above-described, from the formation of the coating through polymerization to the washing of the inside of the polymerization vessel with water, was repeated 80 times batch-wise. Upon the 80th batch, the amount of polymer scale deposited on areas located in the liquid-phase region and that on areas around the interface between gas and liquid phases inside the polymerization vessel were measured in the same manner as in Example 1. The measured amounts of polymer scale deposited were 0 g/m² (liquid phase) and 25 g/m² (around gas-liquid interface), respectively.

Example 4

A stainless-steel polymerization vessel having an internal capacity of 20 liters and equipped with a stirrer was used.

The polymer scale preventive agent used in Experiment No. 204 of Example 2 was applied to the inner wall, the stirring shaft, the stirring blades and other areas with which a monomer during polymerization comes into contact of the polymerization vessel, and was dried by heating at 50° C. for 15 minutes to form a coating, followed by washing the inside of the vessel with water.

Then, the polymerization vessel thus provided with the coating was charged with. 4.0 kg of water and 6 g of sodium dodecylbenzenesulfonate, and temperature was raised to 60° C. with stirring. After the gas phase in the polymerization vessel was replaced with nitrogen gas, the vessel was further charged with 94 g of n-butyl acrylate, 220 g of methyl methacrylate, 5 g of acrylic acid and 5 g of methacrylic acid. Subsequently, 1 g of ammonium persulfate and 1 g of sodium hydrosulfite were charged into the polymerization vessel, and the resulting mixture in the vessel was stirred for 20 minutes.

Furthermore, into the polymerization vessel were added a monomeric mixture (prepared by mixing 2.1 kg of n-butyl acrylate, 4.8 kg of methyl methacrylate, 100 g of acrylic acid and 100 g of methacrylic acid), 500 g of an aqueous 1 wt. % ammonium persulfate solution, 500 g of an aqueous 1 wt. % sodium hydrosulfite solution and 2.0 kg of an aqueous 25 wt. % polyoxyethylene nonyl phenyl ether solution, each by a fixed amount at a time over a period of 3 hours. After the addition was completed, the polymerization vessel was heated to 70° C. and polymerization was carried out for 2 hours.

After the polymerization was over, the resulting polymeric product and unreacted monomers were recovered, and the inside of the vessel was washed with water to remove residual resin.

Thereafter, the same process as above-described, from the formation of the coating through polymerization to the washing of the inside of the polymerization vessel with water, was repeated 80 times batch-wise. Upon the 80th batch, the amount of polymer scale deposited on areas located in the liquid-phase region and that on areas around the interface between gas and liquid phases inside the polymerization vessel were measured in the same manner as in Example 1. The measured amounts of polymer scale deposited were 0 g/m² (liquid phase) and 40 g/m² (around gas-liquid interface), respectively.

We claim:

1. A process for producing a polymer of a monomer having an ethylenically unsaturated double bond, which comprises polymerizing the monomer in a polymerization vessel having a coating on its inner wall surfaces, whereby polymer scale is prevented from being deposited, wherein said coating has been formed by applying an alkaline solution containing:
(A) a condensation product of (A-1) an aromatic compound having at least two amino groups with (A-2) an aromatic tetracarboxylic acid anhydride, and
(B) at least one member selected from the group consisting of (B-1) a water-soluble polymeric compound and (B-2) an inorganic colloid, followed by drying.

2. The process of claim 1, wherein said polymerization is conducted as suspension polymerization, emulsion polymerization, solution polymerization, bulk polymerization or gas phase polymerization.

3. The process of claim 1, wherein said monomer is selected from the group consisting of vinyl halides; vinyl esters; acrylic acid, methacrylic acid and their esters and salts; maleic acid, fumaric acid and their esters and anhydrides; diene monomers; styrene; acrylonitrile; vinylidene halides; and vinyl ethers.

4. The process of claim 1, wherein the component (A-1) comprises at least one compound selected from the group consisting of the compounds of the following formulas (1), (2), (3), (4), (5), (6-1), (6-2), (7-1), (7-2), (7-3), (8), (9-1), (9-2), (10), (11-1) and (11-2):

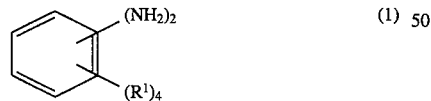
(1)

wherein the $R^1$ groups may be the same or different and are each —H, —NH$_2$, —Cl, —OH, —NO$_2$, —COCH$_3$, —OCH$_3$, —N(CH$_3$)$_2$, —COOH, —SO$_3$H or an alkyl group of from 1 to 3 carbon atoms,

(2)

wherein the $R^1$ groups may be the same or different and are as defined above, the $R^2$ groups may be the same or different and are each an amine group-containing alkyl group of from 1 to 10 carbon atoms,

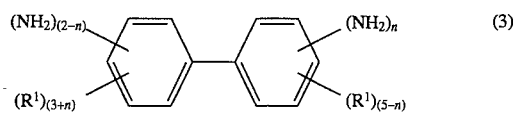
(3)

wherein the $R^1$ groups may be the same or different and are as defined above, and n is an integer of 1 or 2,

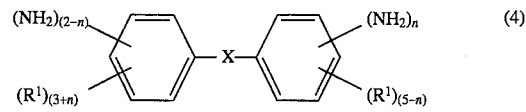
(4)

wherein the $R^1$ groups may be the same or different and are as defined above, n is also as defined above, X is an alkylene group of from 1 to 5 carbon atoms, —CH=CH—, —N=N—, —NH—, —N(CH$_3$), —CONH—, —P(=O)H—, —SO$_2$—, —O—, —S—, —Si(R)$_2$— (wherein R is an alkyl group of from 1 to 10 carbon atoms), or the group of the formula:

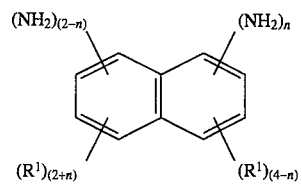
(5)

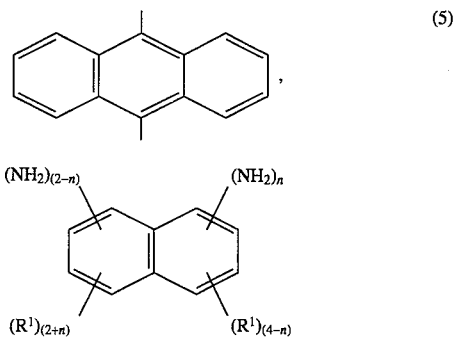

wherein the $R^1$ groups may be the same or different and are as defined above, and n is also as defined above,

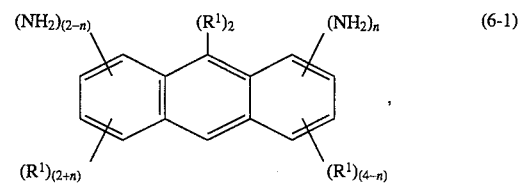
(6-1)

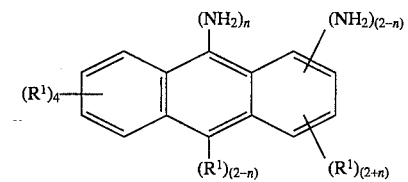

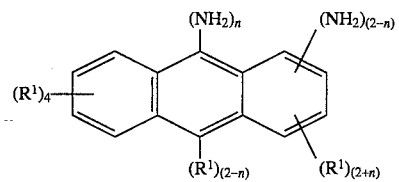

wherein in the formulas (6-1) and (6-2), the $R^1$ groups may be the same or different and are as defined above, and n is also as defined above,

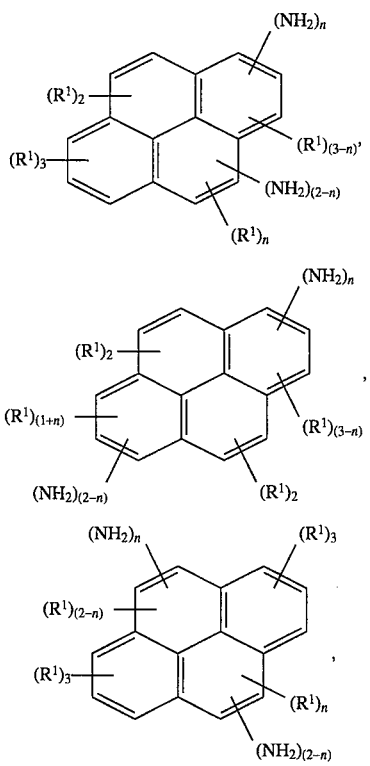

wherein in the formulas (7-1), (7-2) and (7-3), the $R^1$ groups may be the same of different and are as defined above, and n is also as defined above,

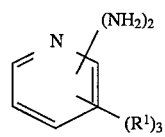

wherein the $R^1$ groups may be the same or different and are as defined above,

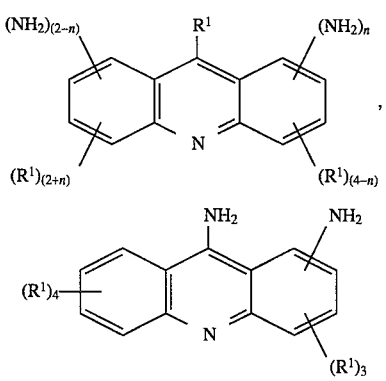

wherein in the formulas (9-1) and (9-2), the $R^1$ groups may be the same or different and are as defined above, and n is also as defined above,

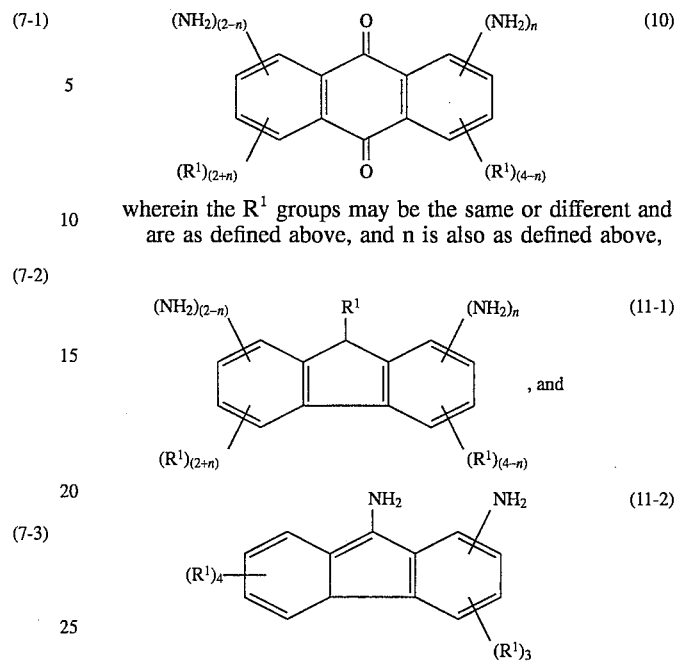

wherein the $R^1$ groups may be the same or different and are as defined above, and n is also as defined above,

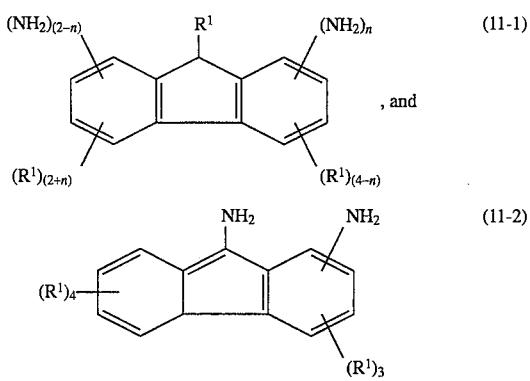

wherein in the formulas (11-1) and (11-2), the $R^1$ groups may be the same or different and are as defined above, and n is also as defined above.

5. The process of claim 1, wherein the component (A-1) comprises at least one compound selected from the group consisting of 3,5-diaminobenzoic acid, 2,5-diaminobenzenesulfonic acid, 4,4'-diamino-3,3'-biphenyldiol, 4,4'-diaminodiphenyl ether, 4,4'-diaminodiphenylamine, 4,4'-diaminodiphenylmethane, 3,3'- and 4,4'-diaminodiphenyl sulfones, 4,4'-diaminobenzanilide, 4,4'-diaminostilbene-2,2,'-disulfonic acid, 4,4'-diaminodiphenylpropane, 2,6-diaminopyridine, and 2,7-diaminofluorene.

6. The process of claim 1, wherein the component (A-2) comprises at least one compound selected from the group consisting of pyromellitic acid, 1,2,5,6-naphthalenetetracarboxylic dianhydride, 2,3,6,7-naphthalenetetracarboxylic dianhydride, and 2,2',6,6'-biphenyltetracarboxylic dianhydride.

7. The process of claim 1, wherein the condensation product (A) is obtained by condensing 1 part of the component (A-1) with from 0.01 to 5 parts by weight of the component (A- 2).

8. The process of claim 1, wherein the component (B) comprises a water-soluble polymeric compound (B-1), and the component (B-1) comprises at least one compound selected from the group consisting of gelatin, casein, polyacrylic acid, carboxymethyl cellulose, polyvinyl pyrrolidone, and pectin.

9. The process of claim 8, wherein the component (B-1) is present in an amount of from 1 to 1000 parts by weight per 100 parts by weight of the component (A).

10. The process of claim 1, wherein the component (B) comprises an inorganic colloid (B-2), and the component (B-2) comprises a colloid of silica, an oxide, a hydroxide or a mixture of two or three thereof, said oxide and hydroxide being those of a metal selected from the group consisting of aluminum, titanium, zirconium, tin and iron.

11. The process of claim 10, wherein the component (B-2) is present in an amount of from 1 to 1000 parts by weight per 100 parts by weight of the component (A).

12. The process of claim 1, wherein the component (B) comprises (B-1) a water-soluble polymeric compound and (B-2) an inorganic colloid.

13. The process of claim 1, wherein the alkaline solution contains water as its solvent.

14. The process of claim 1, wherein the alkaline solution contains a mixed solvent of water and an organic solvent miscible with water, said organic solvent being present in an amount of 50% by weight or less based on the mixed solvent.

15. The process of claim 1, wherein the alkaline solution has a pH in the range from 7.5 to 13.5.

* * * * *